A. FOUCHY.
APPARATUS FOR USE IN UNLOADING SHIPS.
APPLICATION FILED JULY 10, 1919.
1,315,921.
Patented Sept. 9, 1919.
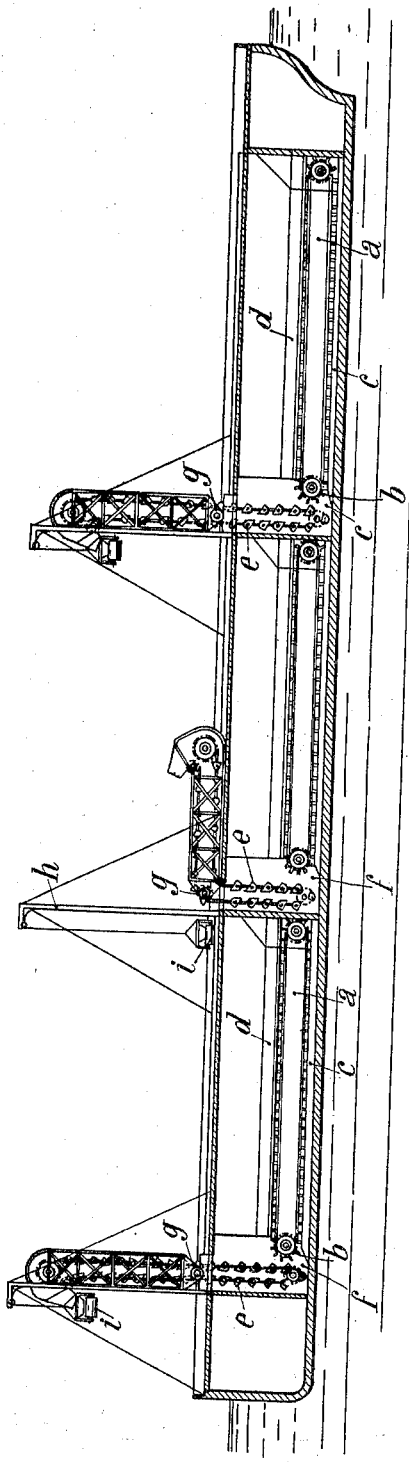
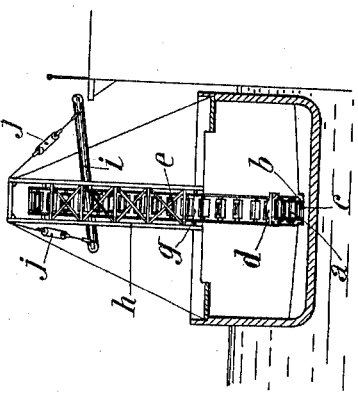
Inventor
Albert Fouchy,
By H. R. Kerslake
Attorney

UNITED STATES PATENT OFFICE.

ALBERT FOUCHY, OF PARIS, FRANCE, ASSIGNOR TO COMPAGNIE DES TRANSPORTEURS SIMPLEX, OF PARIS, FRANCE.

APPARATUS FOR USE IN UNLOADING SHIPS.

1,315,921.  Specification of Letters Patent.  Patented Sept. 9, 1919.

Application filed July 10, 1919. Serial No. 309,914.

*To all whom it may concern:*

Be it known that I, ALBERT FOUCHY, a citizen of the French Republic, residing at 43 Rue Lafayette, Paris, France, have invented certain new and useful Improvements in Apparatus for Use in Unloading Ships, of which the following is a specification.

This invention relates to an apparatus for use in unloading from ships ores and materials in the form of powder, by means of an apparatus which can be easily installed, and it relates more particularly to unloading coal from ships.

This apparatus is chiefly characterized by the installation in each of the water-tight compartments or bunkers of the ship, of an endless horizonal conveyer which scrapes the bottom of the central portion of the said bunker, so as to bring the coal therein, to the bottom of a well where it can be collected by a suitable elevator which discharges it on to a movable conveyer which can be arranged to discharge from the ship in any direction.

A construction according to the invention is illustrated, by way of example, in the accompanying drawing, in which:—

Figure 1 is a vertical longitudinal section of a ship with watertight compartments, and Fig. 2 is a cross-section of the ship.

Each water-tight compartment is provided with mechanical unloading mechanism comprising:

A horizontal conveyer $a$ with scrapers, constituted by stretched chains and scrapers or blades $b$ which drive the coal along a channel $c$ arranged centrally at the lowest point of the bunker. The return section of the conveyer passes along a tunnel $d$ having an inclined roof which separates the conveyer from the mass of material to be extracted.

A vertical elevator $e$ constituted by a bucket chain constantly takes the coal from the bottom of a well $f$, to which the coal is conveyed, and discharges it at a suitable level above the deck. The elevator and the end of the conveyer are isolated in the well $f$.

Having regard to the stability of the ship, the elevator $e$ is pivoted about its center on a spindle $g$ above the bridge, so that the upper part which projects beyond the deck, can be laid down in a single piece on the said deck during navigation. It can also be completely removed.

A mast $h$ provided with stay wires, keeps the elevator in a vertical position, facilitates the raising and laying down of the said elevator, and carries for that purpose guide pulleys for the cable. This mast suitably arranged in the form of a frame or otherwise, moreover supports a movable conveyer $i$ with a motor, by means of two or more tackles $j$. During navigation, the said conveyer is stowed on the deck. It is raised by tackle for the unloading operation, placed in a suitable position under the chute of the elevator and held in the suitable direction by hawsers so as to discharge where desired.

The fuel in the bunkers descends by gravity into the bottom channel of the conveyer $a$ where the scrapers $b$ bring it to the elevator $e$ which discharges it on the movable conveyer $i$ which in turn discharges it from the ship.

The greater part of the cargo is discharged in the foregoing manner, and the remaining part can be easily pushed by rakes to the bottom of each compartment, owing to the slight slope of the floor of the bunker, which is made smooth for the purpose. Shoveling is unnecessary.

This apparatus is more particularly adapted for coaling ships' bunkers.

Obviously the construction hereinbefore described can be applied to the mechanical handling of any desired materials in the form of powder, such as coke, ores, grain, phosphates, pyrites, etc.

Having now particularly described and ascertained the nature of my said invention and in what manner the same is to be performed, I declare that what I claim is:—

In an apparatus of the character described, in combination, a ship having its hull provided with a well opening on the deck thereof, a casing pivotally mounted for vertical swinging movement on the deck and positioned over the well, an endless elevating conveyer operating in the well and the casing, a mast rising from the deck in proximity to the well and a tackle operatively connected with the casing and the mast for raising the casing into an upright position against the mast or for lowering the casing into a horizontal position on the deck of the ship.

In testimony whereof I affix my signature.

ALBERT FOUCHY.